US012655925B2

(12) United States Patent
     Inoue et al.

(10) Patent No.:     US 12,655,925 B2
(45) Date of Patent:       Jun. 16, 2026

(54) BLOCKING DEVICE AND METHOD

(71) Applicant: KURODITE INDUSTRY CO., LTD.,
     Hekinan (JP)

(72) Inventors: Tomohiro Inoue, Takahama (JP);
     Saeko Kume, Takahama (JP)

(73) Assignee: KURODITE INDUSTRY CO., LTD.,
     Hekinan (JP)

( * ) Notice:    Subject to any disclaimer, the term of this
                 patent is extended or adjusted under 35
                 U.S.C. 154(b) by 537 days.

(21) Appl. No.:    18/038,057

(22) PCT Filed:    Nov. 25, 2020

(86) PCT No.:      PCT/JP2020/043836
     § 371 (c)(1),
     (2) Date:     May 22, 2023

(87) PCT Pub. No.: WO2022/113210
     PCT Pub. Date: Jun. 2, 2022

(65)              Prior Publication Data
     US 2023/0366501 A1      Nov. 16, 2023

(51) Int. Cl.
     *F16L 55/124*         (2006.01)
(52) U.S. Cl.
     CPC ................................. *F16L 55/124* (2013.01)
(58) Field of Classification Search
     CPC ......... F16L 41/04; F16L 41/06; F16L 55/128;
                                 F16L 55/124; F16K 7/10
                  (Continued)

(56)              References Cited

U.S. PATENT DOCUMENTS 1,946,138 A * 2/1934 Gardner ................ F16L 55/124
                                                    138/93
3,842,864 A * 10/1974 Riegel ...................... F16K 7/10
                                                    138/93
                  (Continued)

FOREIGN PATENT DOCUMENTS

DE          19530962       2/1997
GB          2449964        12/2008
                  (Continued)

OTHER PUBLICATIONS

International Search Report, PCT/JP2020/043836, dated Jan. 19,
2021, 2 pages.

*Primary Examiner* — Kenneth Rinehart
*Assistant Examiner* — Haotian Lu
(74) *Attorney, Agent, or Firm* — Fattibene and Fattibene,
LLC; Paul A. Fattibene

(57)              ABSTRACT
To provide a blocking device and method capable of safely
blocking a fluid tube. A blocking device (1) that introduces
a bag (50) into a fluid tube (1), and expands the bag (50) by
pressure of fluid to block the inside of the fluid tube (50), the
blocking device (1) including a cylinder (20) connectable to
the fluid tube (1); a guide pipe (30) provided to be movable
forward and backward in an axial direction of the cylinder
(20) in the cylinder (20) and formed with a notch (32) for
passing the bag (50) at a tip end; and a slide tube (40)
inserted into the guide pipe (30) and provided to be movable
forward and backward in the axial direction, and having a tip
end portion connected to the bag (50) and a basal end portion
connected to a fluid source (60) for expanding the bag (50);
where the bag (50) is expanded in a state in which the guide
pipe (30) is withdrawn from the fluid tube (1).

5 Claims, 5 Drawing Sheets

(58) Field of Classification Search
    USPC ........................................................ 138/89
    See application file for complete search history.

(56)                    References Cited

U.S. PATENT DOCUMENTS 4,492,095  A  *  1/1985  Brister ...................... F25D 3/10
                                                  62/51.1
2005/0229985  A1*  10/2005  Saxenfelt ................. F16K 7/10
                                                  138/93

FOREIGN PATENT DOCUMENTS

JP          2002061787      2/2002
JP          2018135938      8/2018
NL            989344  A1  *  3/2000  ............ F16L 55/124

* cited by examiner

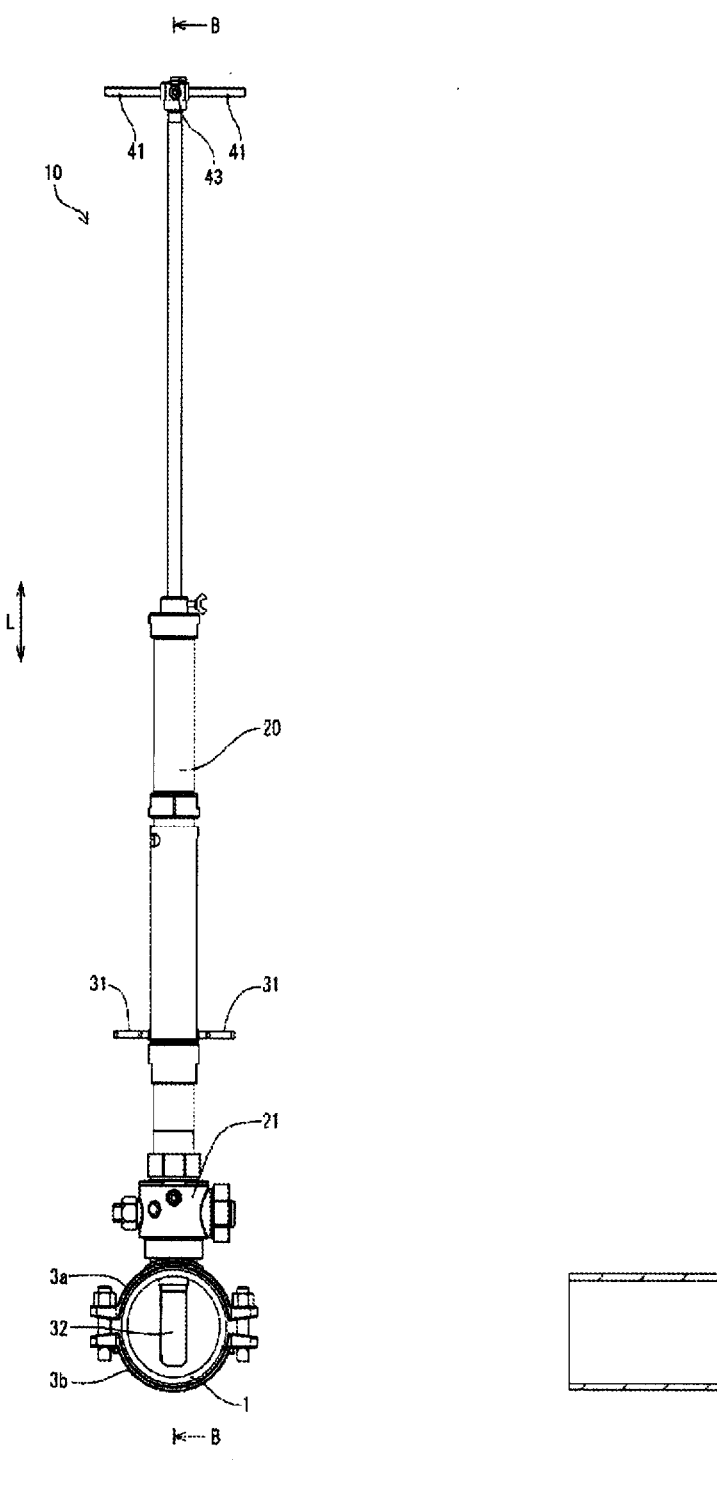
FIG. 3a                 FIG. 3b

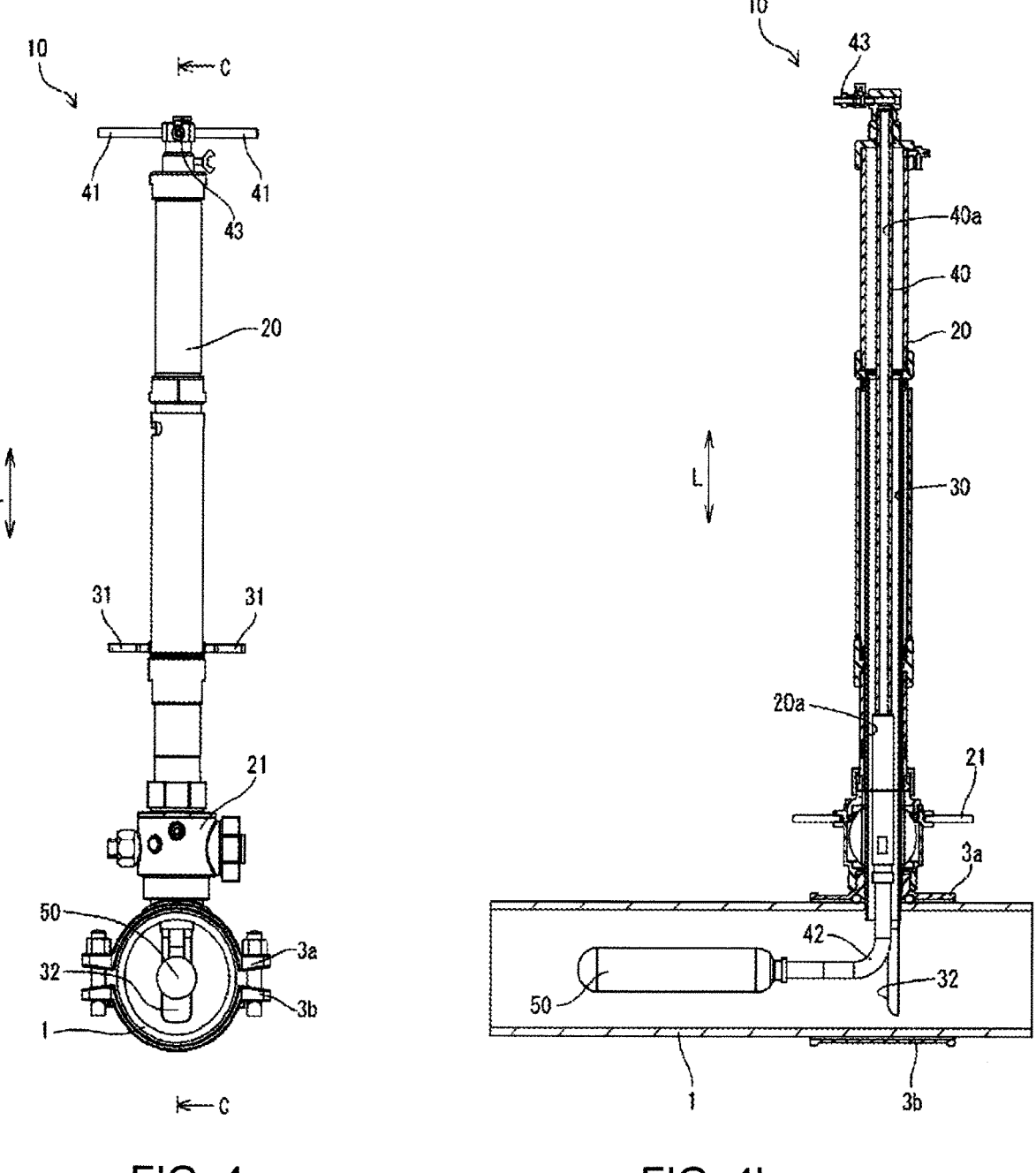
FIG. 4a                    FIG. 4b

BLOCKING DEVICE AND METHOD

TECHNICAL FIELD

The present invention relates to a blocking device that blocks the inside of a fluid tube, and a blocking method using the same.

BACKGROUND ART

When repairing or replacing a fluid tube such as a water pipe or the like buried in the ground, fluid inside the fluid tube in an operation zone needs to be shut down before cutting the fluid tube.

Patent Literature 1 discloses a blocking device that lowers a shaft member after inserting a guide member inside a water supply tube, introduces a bag inside the water supply tube through an opening at a lower end of the guide member, and expand the bag in the water supply tube to shut down the water supply.

CITATION LIST

Patent Literature

PTL 1: JP2018-135938A

SUMMARY OF INVENTION

Technical Problem

However, in a case where pressure fluctuation occurs in the water supply tube in a state in which the water supply tube is blocked with the bag, the blocking device described in Patent Literature 1 has a concern that the bag may move within the water supply tube and collide with the guide member thus deforming the guide member, causing the guide member to be non-storable.

Thus, a technical problem to be solved arises to provide a blocking device and method capable of safely blocking a fluid tube, and an object of the present invention is to solve such a problem.

Solution to Problems

In order to achieve the above object, a blocking device according to the present invention introduces a bag into a fluid tube, and expands the bag by pressure of fluid to block the inside of the fluid tube, the blocking device including a cylinder connectable to the fluid tube, a guide pipe provided to be movable forward and backward in an axial direction of the cylinder in the cylinder and formed with a notch for passing the bag at a tip end, a slide tube inserted into the guide pipe and provided to be movable forward and backward in the axial direction, and having a tip end portion connected to the bag and a basal end portion connected to a fluid source for expanding the bag, and a safety mechanism that allows supply of fluid to the slide tube only in a state in which the guide pipe is withdrawn from the fluid tube, where the bag is expanded in a state in which the guide pipe is withdrawn from the fluid tube.

According to this configuration, the guide pipe and the slide tube are lowered to the fluid tube in this order, the bag is introduced into the fluid tube through the notch, and thereafter, only the guide pipe is raised and the bag is expanded to block the inside of the fluid tube, so that the bag that blocks the fluid tube by pressure fluctuation in the fluid tube can be suppressed from colliding with the tip end of the guide pipe and deforming the guide pipe. Furthermore, the safety mechanism can suppress expansion of the bag in a state in which the guide pipe is retained in the fluid tube by allowing the supply of fluid to the slide tube only in a state in which the guide pipe is withdrawn from the fluid tube.

In addition, in order to achieve the above object, a blocking method according to the present invention is a blocking method using the blocking device described above, the method including steps of connecting the cylinder to the fluid tube, introducing a tip end of the guide pipe into the fluid tube, advancing the cylinder toward the fluid tube and introducing the bag into the fluid tube through the notch, withdrawing the guide pipe from the fluid tube before expanding the bag, and expanding the bag to block the inside of the fluid tube.

According to such a configuration, the guide pipe and the slide tube are lowered to the fluid tube in this order, the bag is introduced into the fluid tube through the notch, and thereafter, the bag is expanded to block the inside of the fluid tube in a state in which only the guide pipe is raised, so that the bag that blocks the fluid tube by pressure fluctuation in the fluid tube can be suppressed from colliding with the tip end of the guide pipe and deforming the guide pipe.

Advantageous Effects of Invention

According to the present invention, the bag that blocks the fluid tube by pressure fluctuation in the fluid tube can be suppressed from colliding with the tip end of the guide pipe and deforming the guide pipe.

BRIEF DESCRIPTION OF DRAWINGS

FIG. 1 is a partially cutout perspective view illustrating a blocking device according to one embodiment of the present invention, where

FIG. 2 is a view illustrating an initial state in which a blocking device is attached to a fluid tube, where

FIG. 3 is a view illustrating a state in which the guide pipe is lowered, where FIG. 3(a) is a front view and FIG. 3(b) is a cross-sectional view taken along line B-B of FIG. 3(a).

FIG. 4 is a view illustrating a state in which the bag is introduced to the fluid pipe, where FIG. 4(a) is a front view and FIG. 4(b) is a cross-sectional view taken along line C-C of FIG. 4(a).

FIG. 5 is a view illustrating a state in which the bag is expanded after the guide pipe is withdrawn from the fluid tube, where

DESCRIPTION OF EMBODIMENTS

Hereinafter, a blocking device 10 according to one embodiment of the present invention will be described based on the drawings. Note that hereinafter, when referring to the number, numerical value, amount, range, or the like of configuring elements, other than when particularly clearly stated and when clearly limited to a specific number in principle, it is not limited to such specific number and may be greater than or equal to or less than or equal to the specific number.

In addition, when referring to the shape and positional relationship of the configuring elements and the like, other than when particularly clearly stated and when considered not clearly so in principle, it substantially includes those approximate to or similar to the shape and the like thereof.

Furthermore, the drawings may be exaggerated by enlarging the characteristic portion to facilitate the understanding of the feature, and the dimensional ratio or the like of the configuring elements may not necessarily be the same as the actual dimensional ratio or the like. Furthermore, in the cross-sectional view, hatching of some configuring elements may be omitted to facilitate the understanding of a cross-sectional structure of the configuring element. Note that in the present example, the words "upper" and "lower" correspond to the upper side and the lower side in the up-down direction.

Figures 1A, 1B:
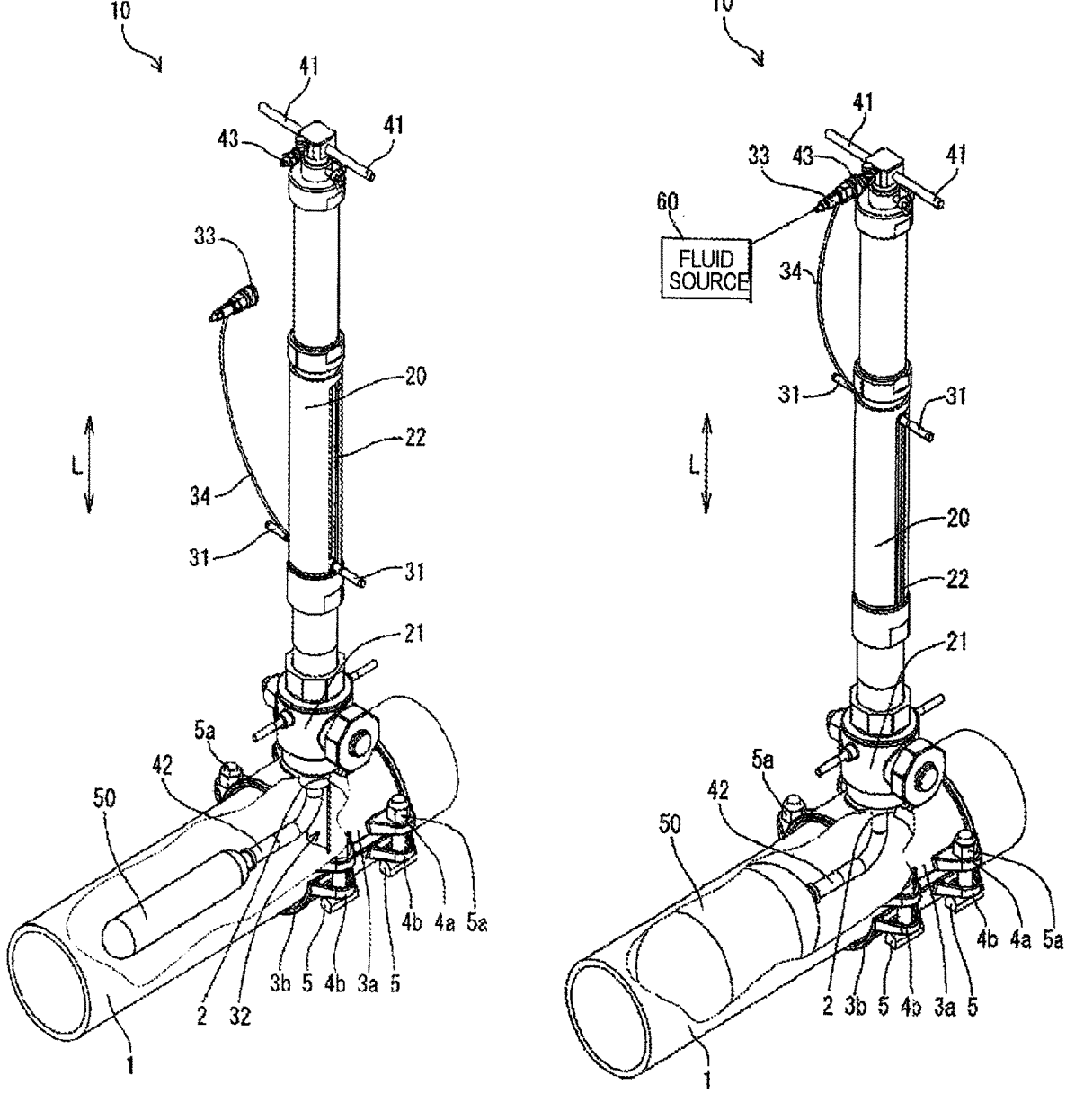
FIG. 1(a) is a view illustrating a state in which a guide pipe is lowered and FIG. 1(b) is a view illustrating a state in which a bag is expanded.
Figure 2A:
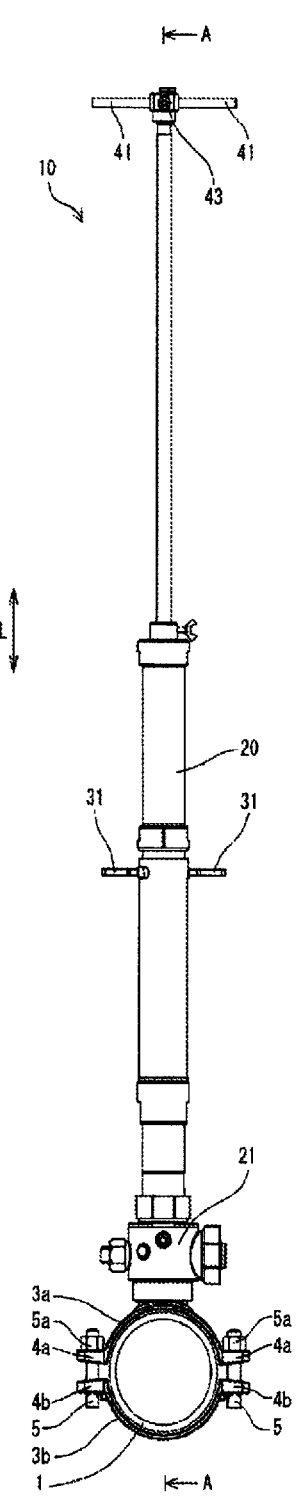
FIG. 2(a) is a front view and FIG. 2(b) is a cross-sectional view taken along line-A-A of FIG. 2(a).
Figure 2B:
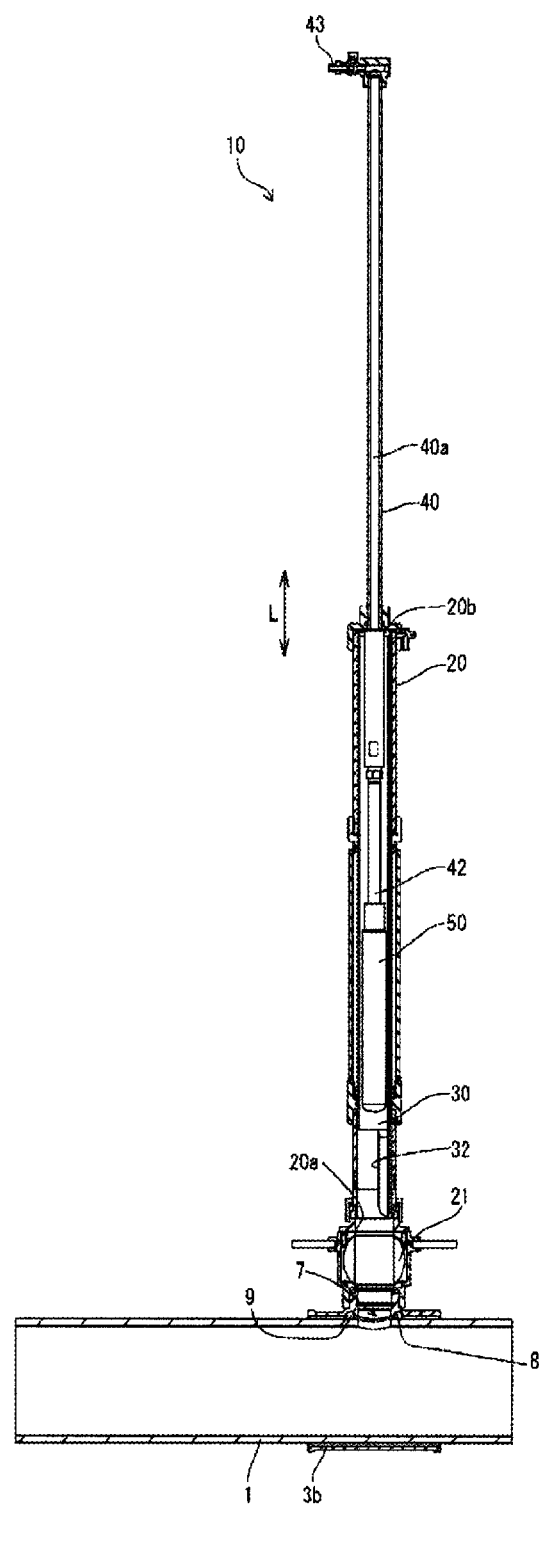

FIGS. 1(a) and 1(b) are partially cutout perspective views illustrating a blocking device 10. FIG. 2(a) is a front view illustrating the blocking device 10, and FIG. 2(b) is a cross-sectional view taken along line A-A of FIG. 2(a). The blocking device 10 is connected to a position corresponding to a perforation 2 of a fluid tube 1 by way of a stopper saddle 3. Note that hereinafter, a case in which the water supply flows through the fluid tube 1 will be described by way of example, but the fluid flowing through the fluid tube 1 is not limited to water supply, and for example, may be liquid such as industrial water, agricultural water, sewage, or the like, gas, or mixture of liquid and gas.

The fluid tube 1 is formed to have a substantially circular cross-sectional shape, and the material thereof is metal, concrete, vinyl chloride, polyethylene, polyolefin, or the like. Alternatively, the inner peripheral surface of the fluid tube 1 may be covered with epoxy resin, mortar or the like.

The stopper saddle 3 presents a substantially cylindrical shape by combining an upper saddle portion 3a and a lower saddle portion 3b so as to face each other, each of which are formed to a substantially half-cylindrical shape.

A side flange 4a is provided on both ends in a width direction of the upper saddle portion 3a. Furthermore, a side flange 4b is provided on both ends in the width direction of the lower saddle portion 3b. The side flanges 4a, 4b are formed with a bolt hole (not shown) through which a bolt 5 is inserted. The bolt 5 is screw fitted with a nut 5a while being inserted to the bolt hole of the side flanges 4a, 4b, thereby integrally fixing the upper saddle portion 3a and the lower saddle portion 3b.

A central flange 6 is provided at the middle of the upper saddle portion 3a. The central flange 6 is provided in a standing manner from the upper saddle portion 3a in an up-down direction orthogonal to the width direction. The central flange 6 is formed to have substantially the same diameter along the up-down direction.

The central flange 6 is formed with an attachment hole 7 that passes through the upper saddle portion 3a in the up-down direction. The attachment hole 7 communicates the inner side and the outer side of the upper saddle portion 3a. The attachment hole 7 is arranged at a position corresponding to the perforation 2.

The inner peripheral surface of the upper saddle portion 3a is formed to curve along the outer periphery of the fluid tube 1. A seal groove 8 engraved on substantially a concentric circle with the attachment hole 7 corresponding to the perforation 2 is provided on the inner peripheral surface of the upper saddle portion 3a. An O-ring 9 is fitted-into the seal groove 8. The O-ring 9 suppresses water supply from leaking out from between the upper saddle portion 3a and the fluid tube 1.

The blocking device 10 includes a cylinder 20, a guide pipe 30, and a slide tube 40.

The cylinder 20 is formed to a substantially cylindrical shape, where an opening 20a is formed at the lower part and a lid 20b is formed at the upper part. The lower end of the cylinder 20 is connected to the stopper saddle 3 by way of a ball valve 21, and the opening 20a of the cylinder 20 is arranged in correspondence with the perforation 2. The cylinder 20 has a water tight structure except for the opening 20a. The cylinder 20 and the fluid tube 1 communicate when the ball valve 21 is opened.

The guide pipe 30 is accommodated in the cylinder 20, and is provided to be movable forward and backward (rise and lower) in an axial direction L in the cylinder 20. The guide pipe 30 is formed to a substantially cylindrical shape.

Two handles 31 are provided in a standing manner on the peripheral surface of the guide pipe 30. The handle 31 is drawn to the outside of the cylinder 20 through a slit 22 formed on the peripheral surface of the cylinder 20.

A half-divided notch 32 is formed at a tip end of the guide pipe 30. The length of the notch 32 can be arbitrarily set in a range of passing the bag 50, and is set to be substantially the same as or shorter than the diameter of the fluid tube 1. The notch 32 is arranged to face the downstream side (left direction in the plane of drawing of FIG. 2(b)) of the flow of water supply in the fluid tube 1 when introduced into the fluid tube 1. Note that the shape of the notch 32 is not limited to a substantially perpendicular shape, and may be any shape as long as it does not interfere with the slide tube 40 when withdrawing the guide pipe 30 from the fluid tube 1, as will be described later.

The guide pipe 30 is provided with a joint 33 and a chain 34 that configure a safety mechanism. The joint 33 is connectable to a suction port 43, described later. The chain 34 has one end fastened to the handle 31 and the other end attached to the joint 33. The length of the chain 34 is set such that the joint 33 does not reach the suction port 43 when the handle 31 is located on the lower side, and the joint 33 reaches the suction port 43 when the handle 31 is located on the upper side.

The slide tube 40 is inserted into the guide pipe 30. Two handles 41 are provided in a standing manner at the upper part of the slide tube 40. The slide tube 40 is formed to a substantially cylindrical shape, and is interiorly provided with a compressed air line 40a. The lower end of the compressed air line 40a is connected to the bag 50 by way of a hose 42, and the upper end of the compressed air line 40a is connected to a fluid source 60 by way of the suction port 43 and the joint 33. The slide tube 40 is provided to be movable forward and backward (rise and lower) in an axial direction L in the guide pipe 30. Note that the guide pipe 30 and the slide tube 40 are independently movable.

The slide tube 40 is connected to the bag 50 by way of a flexible hose 42. The hose 42 is a rubber tube or the like of a predetermined length having flexibility.

Compressed air supplied from the fluid source 60 is fed into the bag 50 through the compressed air line 40a and the hose 42. Note that the fluid for expanding the bag 50 is not limited to compressed air.

Next, a procedure for blocking the inside of the fluid tube 1 will be described based on the drawings.

First, as illustrated in FIGS. 2(a) and 2(b), the cylinder 20 is attached to the fluid tube 1 through the stopper saddle 3. The bag 50 is accommodated in the guide pipe 30 in a compressed state.

Next, as illustrated in FIGS. 3(a) and 3(b), the guide pipe 30 is lowered in a state in which the slide tube 40 is made stationary. Specifically, when the operator grips the handle 31 and lowers the guide pipe 30, the tip end of the guide pipe 30 is introduced into the fluid tube 1. At this time, the guide pipe 30 is preferably lowered until the peripheral surface of the guide pipe 30 reaches the fluid tube 1. Thus, burr, and the like attached to the inner peripheral surface of the perforation 2 can be suppressed from damaging the bag 50 at the time of inserting the bag 50.

Next, as illustrated in FIGS. 4(*a*) and 4(*b*), the bag 50 is introduced inside the fluid tube 1. Specifically, when the operator grips the handle 41 and lowers the slide tube 40, the bag 50 is introduced into the fluid tube 1 through the notch 32. Note that as the water supply flows from the upstream side toward the downstream side and the tip end of the guide pipe 30 is located on the upstream side of the water supply with respect to the bag 50 in the fluid tube 1, the hose 42 is curved and the bag 50 is introduced to the downstream side of the fluid tube 1. Furthermore, in a case where the notch 32 is formed to incline toward the downstream side of the fluid tube 1, the bag 50 can be smoothly introduced into the fluid tube 1.

Figures 5A, 5B:
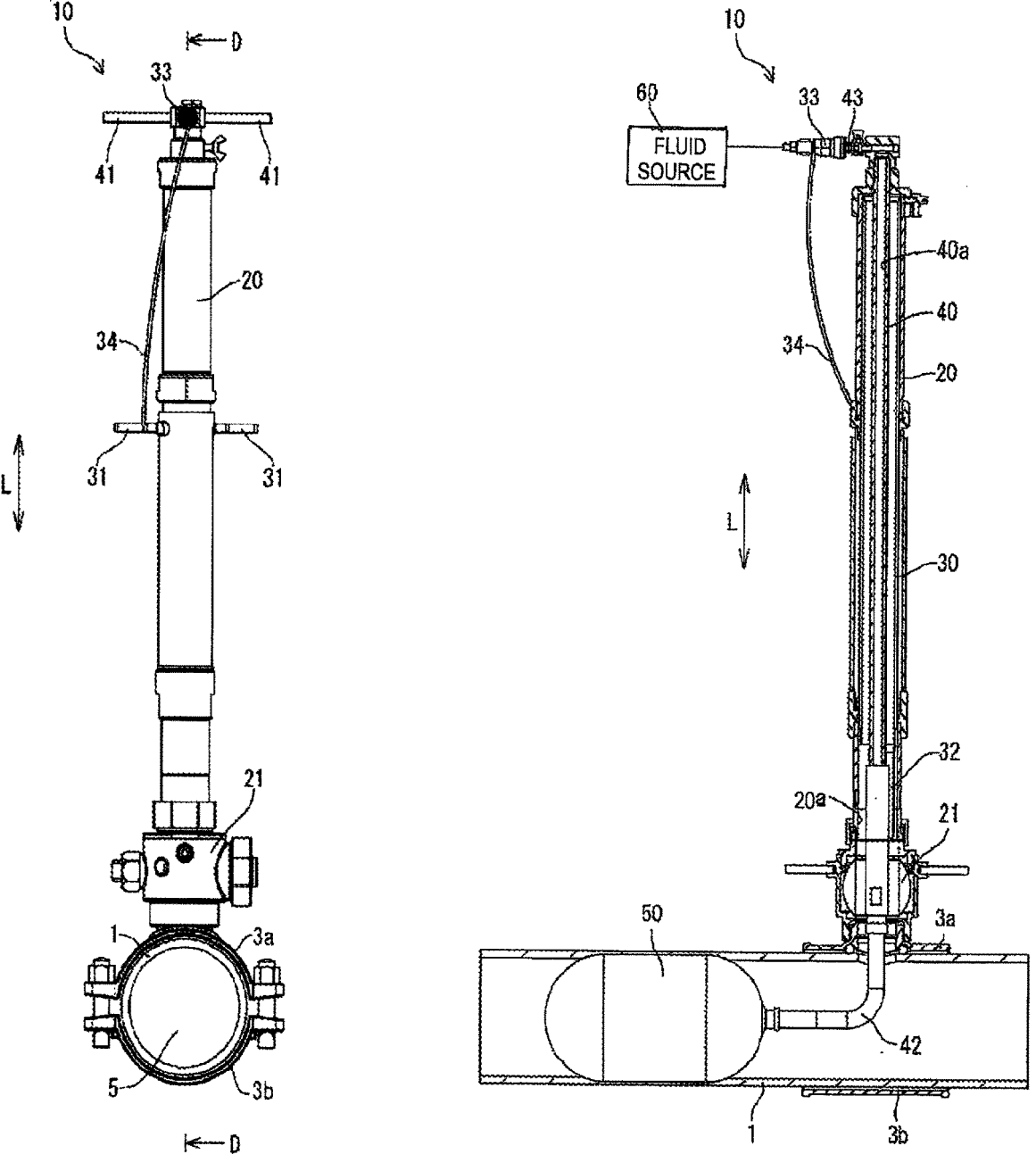
FIG. 5(a) is a front view and FIG. 5(b) is a cross-sectional view taken along line D-D of FIG. 5(a).

Next, as illustrated in FIGS. 5(*a*) and 5(*b*), the bag 50 is expanded to block the inside of the fluid tube 1 in a state in which the guide pipe 30 is withdrawn from the fluid tube 1.

Specifically, first, when the operator grips the handle 31 and raises the guide pipe 30, the tip end of the guide pipe 30 is withdrawn from the fluid tube 1 in a state in which the slide tube 40 is lowered.

Next, the fluid source 60 and the suction port 43 are connected by way of the joint 33, the fluid source 60 is activated, the compressed air is supplied to the bag 50 through the compressed air line 40*a* and the hose 42, and the bag 50 is expanded to block the fluid tube 1 (stop water). Thus, even in a case where the bag 50 moves toward the upstream side by pressure fluctuation in the fluid tube 1, the bag 50 can be avoided from coming into contact with the guide pipe 30.

Thus, the blocking device 10 according to the present embodiment is a blocking device 10 that introduces the bag 50 into the fluid tube 1, and expands the bag 50 by pressure of fluid to block the inside of the fluid tube 1, the blocking device including a cylinder 20 connectable to the fluid tube 1; a guide pipe 30 provided to be movable forward and backward in the axial direction L of the cylinder 20 in the cylinder 20 and formed with a notch 32 for passing the bag 50 at the tip end; a slide tube 40 inserted into the guide pipe 30 and provided to be movable forward and backward in the axial direction L and having a tip end portion connected to the bag 50 and a basal end portion connected to a fluid source 60 for expanding the bag 50; and a safety mechanism for allowing supply of fluid to the slide tube 40 only in a state in which the guide pipe 30 is withdrawn from the fluid tube 1; where the bag 50 is expanded in a state in which the guide pipe 30 is withdrawn from the fluid tube 1.

According to such a configuration, the guide pipe 30 and the slide tube 40 are lowered to the fluid tube 1 in this order, the bag 50 is introduced into the fluid tube 1 through the notch 32, and thereafter, the bag 50 is expanded to block the inside of the fluid tube 1 in a state in which only the guide pipe 30 is withdrawn from the fluid tube 1, so that the bag 50 that blocks the fluid tube 1 by pressure fluctuation in the fluid tube 1 can be suppressed from colliding with the tip end of the guide pipe 30 and deforming the guide pipe 30. Furthermore, the safety mechanism can suppress expansion of the bag 50 in a state in which the guide pipe 30 is retained in the fluid tube 1 by allowing the supply of fluid to the slide tube 40 only in a state in which the guide pipe 30 is withdrawn from the fluid tube 1.

Furthermore, the blocking device 10 according to the present embodiment has a configuration in which the safety mechanism includes a joint 33 capable of connecting the fluid source 60 and the suction port 43 of the slide tube 40, and a chain 34 for connecting the joint 33 and the handle 31, where the length of the chain 34 is set to be substantially equal to the distance of the handle 31 and the suction port 43 in a state in which the guide pipe 30 is withdrawn from the fluid tube 1.

According to such a configuration, if not a state in which the guide pipe 30 is withdrawn from the fluid tube 1, the fluid source 60 cannot be connected to the suction port 43 through the joint 33 and the bag 50 cannot be expanded, and thus the bag 50 can be reliably suppressed from being expanded in a state in which the guide pipe 30 is retained in the fluid tube 1.

A blocking method using the blocking device 10 according to the present embodiment has a configuration including a step of connecting a cylinder 20 to a fluid tube 1, a step of introducing a tip end of the guide pipe 30 to the fluid tube 1, a step of lowering the slide tube 40 toward the fluid tube 1 and introducing the bag 50 to the fluid tube 1 through a notch 32, a step of withdrawing the guide pipe 30 from the fluid tube 1 before expanding the bag 50, and a step of expanding the bag 50 to block the inside of the fluid tube 1.

According to such a configuration, the guide pipe 30 and the slide tube 40 are lowered to the fluid tube 1 in this order, the bag 50 is introduced into the fluid tube 1 through the notch 32, and thereafter, the bag 50 is expanded to block the inside of the fluid tube 1 in a state in which only the guide pipe 30 is withdrawn from the fluid tube 1, so that the bag 50 that blocks the fluid tube 1 by pressure fluctuation in the fluid tube 1 can be suppressed from colliding with a tip end of the guide pipe 30 and deforming the guide pipe 30.

In addition, other than the description made above, various modifications can be made within a scope not deviating from the spirit of the present invention, and it should be recognized that the present invention encompasses all such modifications.

For example, in the embodiment described above, a configuration including the joint 33 and the chain 34 has been exemplified as a safety mechanism for allowing supply of fluid to the slide tube 40 only in a state in which the guide pipe 30 is withdrawn from the fluid tube 1, but the configuration of the safety mechanism is not limited thereto. For example, the chain 34 merely needs to be a rope-like member that can connect the joint 33 and the guide pipe 30, and may be a cord, or the like.

REFERENCE SIGNS LIST

1: fluid tube
2: perforation
3: stopper saddle
3*a*: upper saddle portion
3*b*: lower saddle portion
4*a*: side flange
4*b*: side flange
5: bolt
5*a*: nut
6: central flange
7: attachment hole
8: seal groove
9: O-ring
10: blocking device

20: cylinder
20*a*: opening
20*b*: lid
21: ball valve
22: slit
30: guide pipe
31: handle (of guide pipe)
32: notch
33: joint (safety mechanism)
34: chain (safety mechanism)
40: slide tube
40*a*: compressed air line
41: handle (of slide tube)
42: hose
43: suction port
50: bag
60: fluid source

The invention claimed is:

1. A blocking device that introduces a bag into a fluid tube, and expands the bag by pressure of fluid to block the inside of the fluid tube, the blocking device comprising:
    a cylinder connectable to the fluid tube;
    a guide pipe having a handle, the guide pipe provided to be movable forward and backward in an axial direction of the cylinder in the cylinder and formed with a notch for passing the bag at a tip end;
    a slide tube inserted into the guide pipe and provided to be movable forward and backward in the axial direction, and having a tip end portion connected to the bag and a basal end portion connected to a fluid source for expanding the bag; and
    a safety mechanism that allows supply of fluid to the slide tube only in a state in which the guide pipe is withdrawn from the fluid tube;
    wherein the bag is expanded in a state in which the guide pipe is withdrawn from the fluid tube.

2. The blocking device according to claim 1, wherein:
    the safety mechanism includes,
    a joint for connecting the fluid source and a suction port of the slide tube, and
    a cord for connecting the joint and the handle of the guide pipe; and a length of the cord is set to be substantially equal to a distance of the handle and the suction port in a state in which the guide pipe is withdrawn from the fluid tube.

3. A blocking method using the blocking device described in claim 1, the blocking method comprising the steps of:
    connecting the cylinder to the fluid tube;
    introducing a tip end of the guide pipe into the fluid tube;
    advancing the slide tube toward the fluid tube and introducing the bag into the fluid tube through the notch;
    withdrawing the guide pipe from the fluid tube before expanding the bag; and
    expanding the bag to block the inside of the fluid tube.

4. A blocking method using the blocking device described in 2, the blocking method comprising the steps of:
    connecting the cylinder to the fluid tube;
    introducing a tip end of the guide pipe into the fluid tube;
    advancing the slide tube toward the fluid tube and introducing the bag into the fluid tube through the notch;
    withdrawing the guide pipe from the fluid tube before expanding the bag; and
    expanding the bag to block the inside of the fluid tube.

5. A blocking device that introduces a bag into a fluid tube, and expands the bag by pressure of fluid to block the inside of the fluid tube, the blocking device comprising:
    a cylinder connectable to the fluid tube;
    a guide pipe provided to be movable forward and backward in an axial direction of said cylinder in said cylinder and formed with a notch for passing the bag at a tip end;
    a slide tube inserted into said guide pipe and provided to be movable forward and backward in the axial direction, and having a tip end portion connected to the bag and a basal end portion connected to a fluid source for expanding the bag; and
    a mechanical linkage having a first end connected to a joint configured to couple to the basal end on said slide tube and a second end connected to said guide pipe, wherein when the joint is connected to the basal end on said slide tube said guide pipe is withdrawn from the fluid tube,
    whereby the bag is expanded in a state in which said guide pipe is withdrawn from the fluid tube.

* * * * *